United States Patent
Kelliher

(10) Patent No.: US 8,085,309 B1
(45) Date of Patent: Dec. 27, 2011

(54) GPS ENHANCED CAMERA FOR TRANSMITTING REAL-TIME TRAIL DATA OVER A SATELLITE/CELLULAR COMMUNICATION CHANNEL

(76) Inventor: Christopher R. Kelliher, Waukesha, WI (US)

( * ) Notice: Subject to any disclaimer, the term of this patent is extended or adjusted under 35 U.S.C. 154(b) by 0 days.

(21) Appl. No.: 12/576,980

(22) Filed: Oct. 9, 2009

Related U.S. Application Data

(63) Continuation-in-part of application No. 10/956,698, filed on Sep. 29, 2004, now Pat. No. 7,623,155.

(51) Int. Cl.
*H04N 5/76* (2006.01)
*H04N 9/47* (2006.01)

(52) U.S. Cl. .................. 348/211.2; 348/143

(58) Field of Classification Search .............. 348/153, 348/154, 156, 211.1, 211.2, 143, 372, 207.99, 348/211.3
See application file for complete search history.

(56) References Cited

U.S. PATENT DOCUMENTS

| | | | |
|---|---|---|---|
| 5,517,201 A * | 5/1996 | Thompson, Jr. ............. | 342/417 |
| 5,731,785 A | 3/1998 | Lemelson | |
| 6,034,722 A | 3/2000 | Viney et al. .................. | 348/135 |
| 6,181,373 B1 | 1/2001 | Coles | |
| 6,208,266 B1 | 3/2001 | Lyons | |
| 6,449,431 B1 * | 9/2002 | Cuddeback et al. ............ | 396/27 |
| 6,970,183 B1 * | 11/2005 | Monroe ........................ | 348/143 |
| 7,035,313 B2 * | 4/2006 | Fry ................................ | 375/132 |
| 7,143,639 B2 | 12/2006 | Gobush ........................ | 73/65.03 |
| 7,463,304 B2 * | 12/2008 | Murray ........................ | 348/371 |
| 2003/0063027 A1 | 4/2003 | Allen, Jr. | |
| 2003/0125079 A1 | 7/2003 | Park | |
| 2003/0174099 A1 * | 9/2003 | Bauer et al. .................... | 343/893 |
| 2003/0189638 A1 * | 10/2003 | Fry ................................ | 348/154 |
| 2004/0196155 A1 * | 10/2004 | Wilker et al. ............... | 340/691.1 |
| 2004/0228504 A1 * | 11/2004 | Chang .......................... | 382/118 |
| 2005/0212912 A1 * | 9/2005 | Huster .......................... | 348/155 |

* cited by examiner

*Primary Examiner* — David Ometz
*Assistant Examiner* — Ahmed A Berhan

(57) ABSTRACT

A stand-alone camera system for capturing and transmitting real-time trail data over a wireless communication system to pre-programmable electronic destinations. A CPU receives triggering information and thereby sets the capturing mechanism to a triggering mode. Such triggering information is set at a sensitivity level and a time frame. The automatic toggling mechanism includes a plurality of infra-red sensors that detect a plurality of operating parameters. If a triggered interruption does not last for the time frame, the CPU returns to the sleep mode for conserving battery consumption. If the triggered interruption lasts for the time frame, the CPU wakes up the capturing and monitoring mechanism and thereby causes the capturing and monitoring mechanism to automatically capture an image of a triggered interrupter associated with the triggered interruption. Such captured images are then wirelessly transmitted to the pre-programmable electronic destinations for viewing.

12 Claims, 6 Drawing Sheets

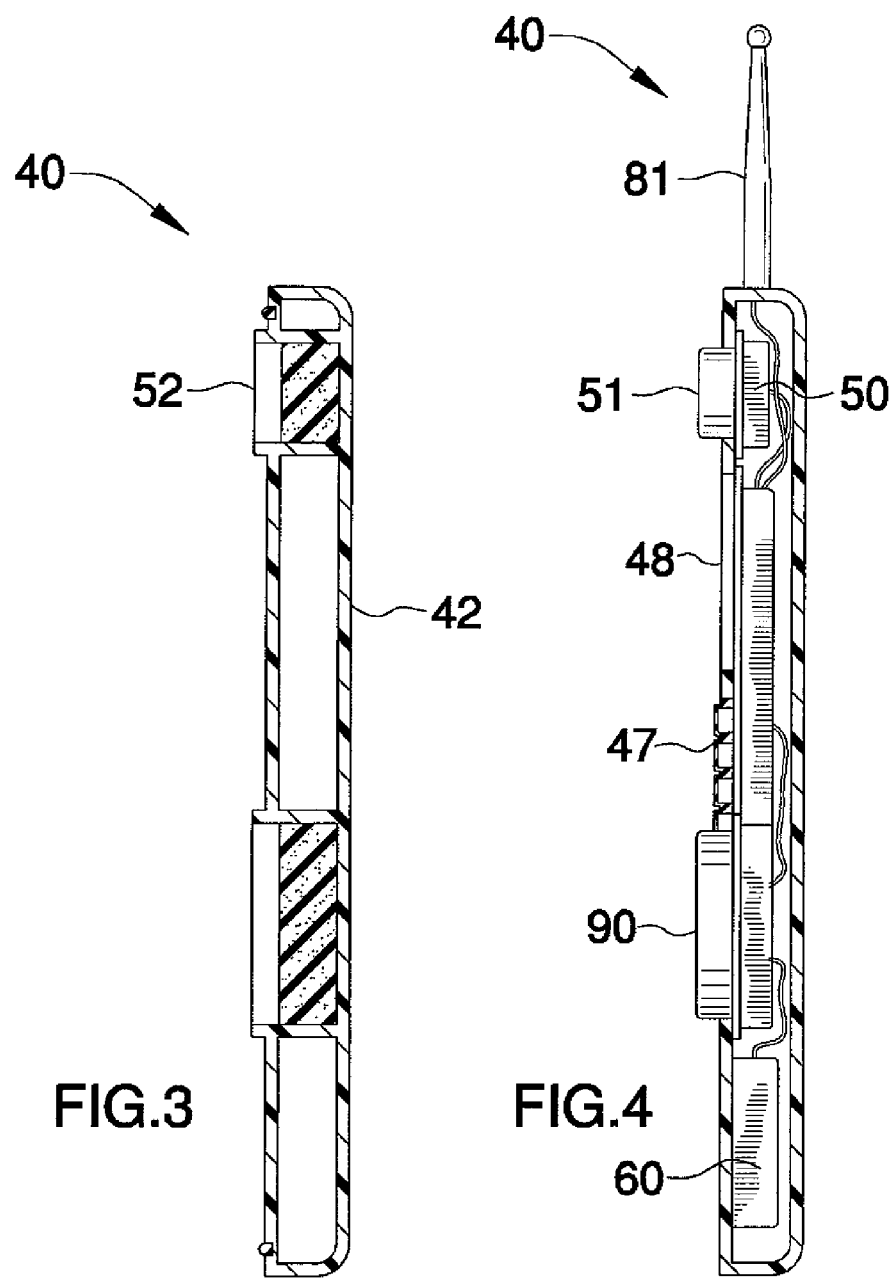

GPS ENHANCED CAMERA FOR TRANSMITTING REAL-TIME TRAIL DATA OVER A SATELLITE/CELLULAR COMMUNICATION CHANNEL

CROSS REFERENCE TO RELATED APPLICATIONS

This application is a continuation-in-part application of U.S. patent application Ser. No. 10/956,698, filed Sep. 29, 2004 now U.S. Pat. No. 7,623,155.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a camera and, more particularly, to a global positioning system (GPS) enhanced camera for transmitting real-time trail data over a cellular/satellite communication channel.

2. Prior Art

Utility companies, such as those providing electric, gas and water service, measure the consumption of their respective services by customers via meters attached to the customer premises.

One typical system utilized by utility companies for accessing utility usage information requires one or more human meter readers to visit every customer premises and physically read each customer's utility meter, whether by visual inspection (e.g., if the meter being read is a non-machine-readable type of meter) or by use of a gun (e.g., if the meter being read is an encoder type of machine-readable meter). In practice, this system of meter reading is extremely costly and time consuming, because the utility company must pay the meter readers for the time spent traveling to and from customer sites and reading the meters. In addition, unrealized revenues due to extending credit to utility consumers for months at a time can disturb the utility company's cash flow and investment. Thus, the utility industry has recognized the need for an automated system for reading and more closely managing utility consumption.

Another application of recording cameras are in the field of security systems, including a television camera for taking a scene of a trespass upon a predetermined region at a site to be monitored, a video recorder for recording the image of the scene taken by the television camera, and a sensor for sensing a trespass and outputting a signal for starting the television camera and the video recorder. The drawback to many of these systems is that the recordings are only viewed after the trespass has taken place, instead of alerting the property owner immediately. Such systems also require hard-wired connections between devices.

Hunters often spend hours on end determining the tracks along which their prey travel, how often they do so, and what times of the day they are most likely to travel along those tracks. This procedure can often be uninteresting and especially unrewarding in the event that the track they are observing is no longer in use by the animal they are hunting. Additionally, if the hunter has more than one location to monitor, film/storage media must be kept straight to identify location of pictures taken.

Accordingly, a need remains for a GPS enhanced camera for transmitting real-time data over a cellular/satellite communication channel in order to overcome the above-noted shortcomings. The present invention satisfies such a need by advantageously providing a system that conveniently converge the technologies and capabilities of a battery powered picture cellular phone, a GPS data receiver and infrared motion detection devices. Such a system conveniently allows for real time data transmittal and reception, thus immediately notifying the user of the system about any activity within the vicinity of the transmitter. The present invention will be appreciated by individuals in many different fields including, but not limited to, law enforcement, hunters and private property owners.

BRIEF SUMMARY OF THE INVENTION

In view of the foregoing background, it is therefore an object of the present invention to provide a GPS enhanced camera for transmitting real-time trail data over a cellular/satellite communication channel. These and other objects, features, and advantages of the invention are provided by a GPS enhanced camera system for capturing and transmitting real-time trail data over a cellular/satellite communication system.

The camera includes a central processing unit (CPU) having control logic for generating output signals based upon corresponding user input signals. A hand-operable controller allows a user to remotely transmit the input signals to the CPU. Such a controller may include a cellular telephone capable of operating via a GPS. The controller further includes a mechanism for automatically toggling the capturing mechanism between operable and non-operable modes based upon the output signals received from the CPU so that a user can advantageously visualize activity occurring at a remote location. Access to information is obtained by single digit input via telephone keypad strokes commonly employed via conventional camera cell phones or the like, as well known in the industry.

The system further includes a mobile housing including a base and a cover pivotally connected thereto and selectively movable between open and closed positions corresponding to operating and non-operating positions respectively. The housing base and the housing cover may be provided with engageable outer edge portions. Such a housing further includes a plurality of hasps extending outwardly from the outer edge portions. One pair of the hasps receives a fastening member, such as a security lock, therethrough for advantageously maintaining the housing at a closed position. The housing further includes a plurality of flexible straps extending along a width of the housing cover having opposed end portions secured to the housing and removably attachable to other ones of the hasps respectively. Such straps advantageously assist in maintaining the housing at an elevated position during operating conditions.

The housing also includes a mechanism for capturing trail images. Such a capturing mechanism is disposed within the housing base. The capturing mechanism preferably includes a digital camera including a protective cover oppositely attached to the camera cover so that the camera cover can effectively mate with the camera when the housing is adapted to a closed position.

The housing further includes a keypad for identifying access codes and instructions by which a user can directly operate the capturing mechanism. An internal power source with smart battery technology is electrically coupled to the housing and a display panel is positioned at the housing base adjacent to the keypad for visually identifying the programmed information such as the trail location, time/date, temperature, pressure, battery status, etc.

The camera system also includes a wireless communication link for transmitting the input signals between remote locations, such as a GPS transmitting/receiving link for location identification. The communication link preferably includes a GPS satellite network. Of course, other communication links such as LANs, WANs, and the Internet may be employed by the present invention, as well known to a person of ordinary skill in the art. The camera system may further include a plurality of sensors operably connected to the housing for conveniently providing real-time temperature data and barometric pressure data for a predetermined area surrounding the housing, as well as the battery status of unit.

A mechanism is included for wirelessly sending the trail images in real-time to any properly equipped cellular/satellite/Internet device based upon the input and output signals respectively. Such a sending mechanism includes an antenna for advantageously facilitating transmission of the trail images over the communication link such that a continuous GPS signal can monitor the location.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a cross-sectional view of the camera system shown in FIG. 1, taken along line 3-3;

FIG. 4 is a cross-sectional view of the camera system shown in FIG. 1, taken along line 4-4;

DETAILED DESCRIPTION OF THE INVENTION

Figure 1:
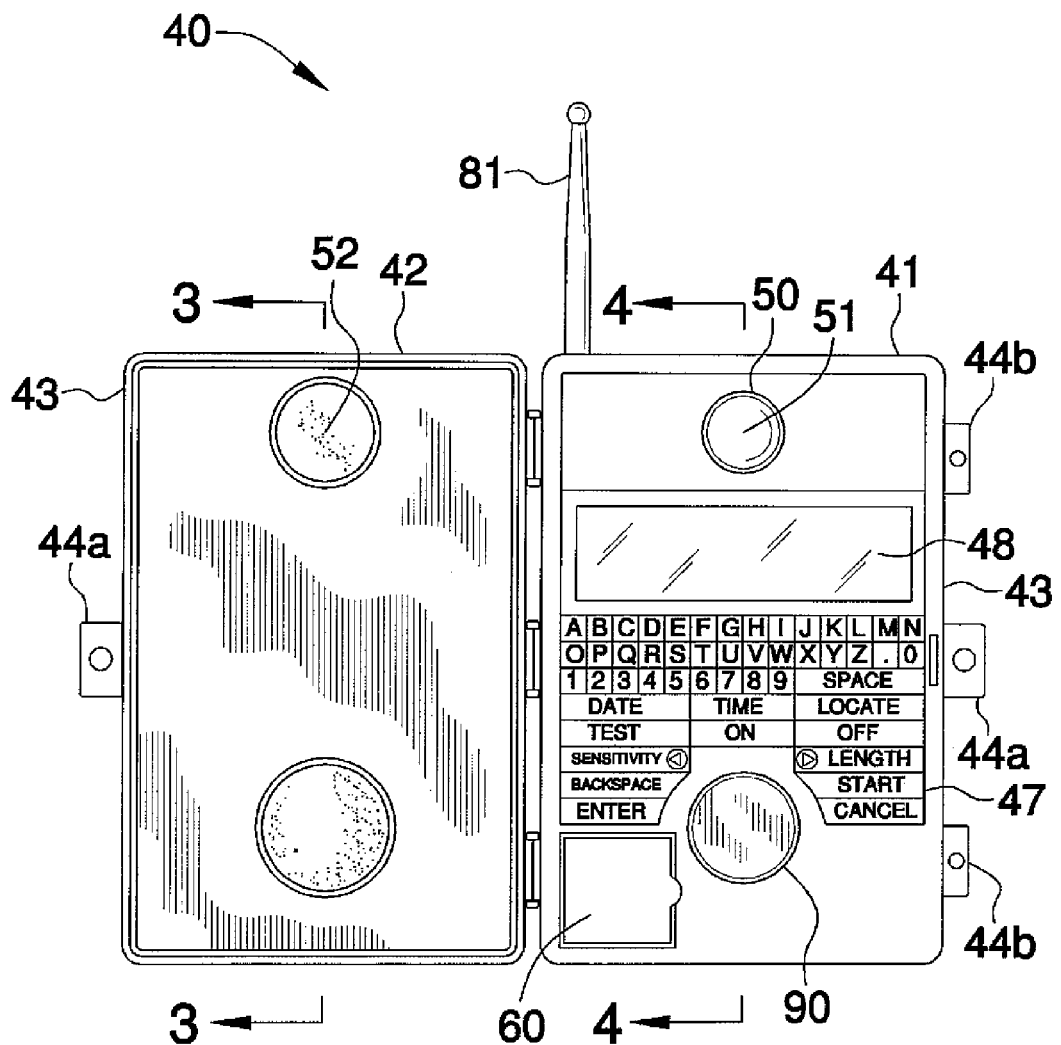
FIG. 1 is a front elevational view showing a GPS enhanced camera system for transmitting real-time trail data over a cellular/satellite communication channel, in accordance with one embodiment of the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-5 by the reference numeral 10 and is intended to provide a GPS enhanced camera system for capturing and transmitting real-time trail data over a cellular/satellite communication system. It should be understood that the system 10 may be used to capture and transmit many different types of data and should not be limited to only hunting applications.

Figure 5:
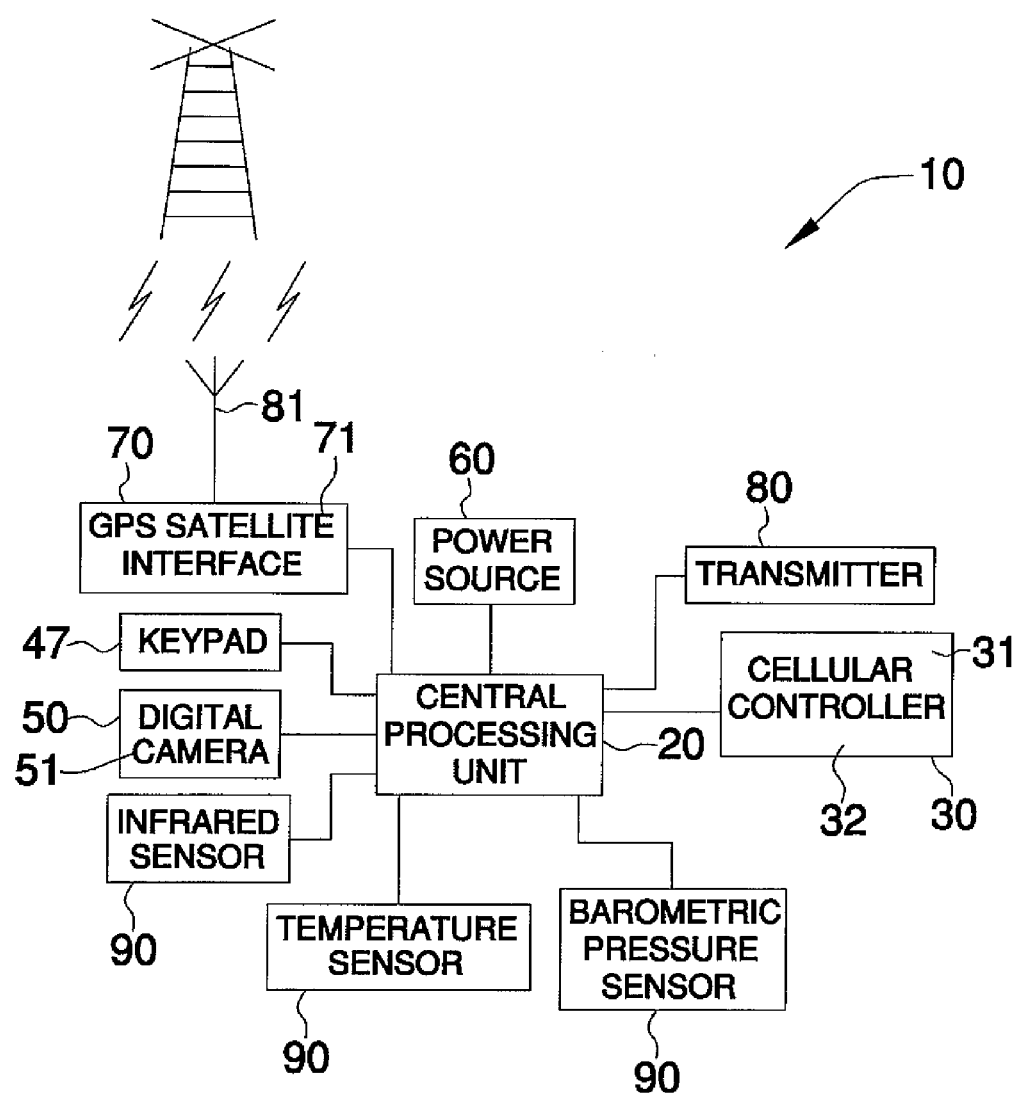
FIG. 5 is a schematic block diagram view of the camera system shown in FIG. 1.

Referring initially to FIG. 5, the system 10 includes a central processing unit 20 (CPU) having control logic for generating output signals based upon corresponding user input signals. Additionally, the CPU processes the present location via GPS transmit/receive signals. A hand-operable controller 30 allows a user to remotely transmit the input signals to the CPU 20. CPU 20 can also be programmed "on site" via keyboard entry. Such a controller 30 includes a cellular telephone 31, but may, of course, also utilize any other controller well known to those skilled in the art.

It is noted that a special controller need not be included. For example, the controller may include any standard camera cell phone or the like. The controller 30 further includes a mechanism 32 for automatically toggling the capturing mechanism between operable and non-operable modes based upon the output signals received from the CPU 20 so that a user can advantageously visualize activity occurring at a remote location. This feature is especially helpful to those participating in hunting activities or security surveillance at a private residence when no one is at the residence.

Figure 2:
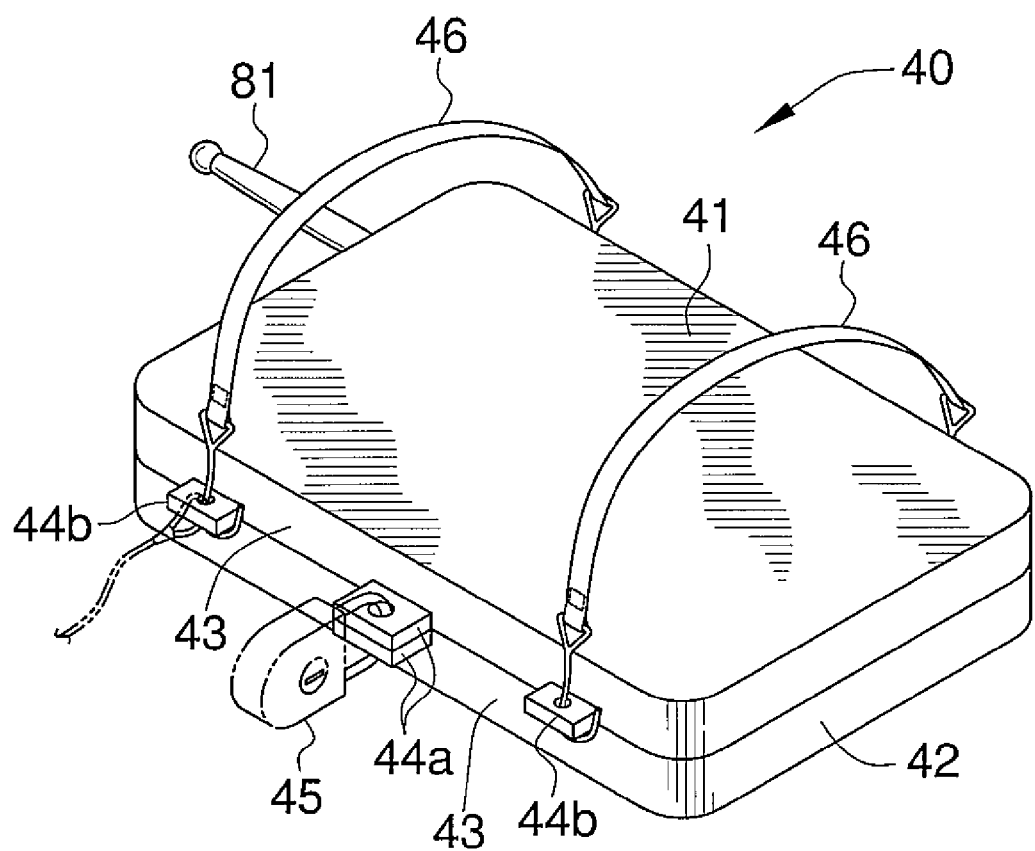
FIG. 2 is a rear perspective view of the camera system shown in FIG. 1.

Referring to FIGS. 1 and 2, the system 10 further includes a mobile housing 40 including a base 41 and a cover 42 pivotally connected thereto and selectively movable between open and closed positions corresponding to operating and non-operating positions respectively. The housing base 41 and the housing cover 42 are provided with engageable outer edge portions 43. Such a housing 40 further includes a plurality of hasps 44 extending outwardly from the outer edge portions 43. One pair of the hasps 44a receives a fastening member 45 therethrough for advantageously maintaining the housing 40 at a closed position.

Such a fastening member 45 advantageously prevents unauthorized individuals from tampering with the housing 40. The housing 40 further includes a plurality of flexible straps 46 extending along a width of the housing cover 42 having opposed end portions secured to the housing 40 and removably attachable to other ones of the hasps 44b respectively. Such straps 46 advantageously assist in maintaining the housing 40 at an elevated position during operating conditions. The straps 46 allow the housing 40 to be suspended from a variety of structures including, but not limited too, trees, poles and other structures of adequate diameter.

Referring to FIGS. 1 and 4, the housing 40 also includes a mechanism 50 for capturing trail images. Such a capturing mechanism 50 is disposed within the housing base 41. The capturing mechanism 50 includes a digital camera 51 including a protective cover 52 oppositely attached to the housing cover 42 so that the camera cover 52 can effectively mate with the camera 51 when the housing 40 is adapted to a closed position, advantageously preventing damage to the camera 51, as shown in FIG. 3.

Referring to FIG. 1, the housing 40 further includes a keypad 47 for identifying access codes and instructions by which a user can directly operate the capturing mechanism 50. An internal power source 60 is electrically coupled to the housing 40 and a display panel 48 is positioned at the housing base 41 adjacent to the keypad 47 for visually identifying the programmed data such as GPS location, time/date, temperature, battery, status, etc.

Referring to FIG. 5, the camera system 10 also includes a wireless communication link 70 for transmitting or receiving the input signals between remote locations, which may include a GPS satellite network 71, for example.

Still referring to FIG. 5, a mechanism 80 is included for wirelessly sending the trail images in real-time to the controller 30 based upon the input and output signals respectively. Such a sending mechanism 80 includes an antenna 81 for advantageously facilitating transmission of the trail images over the communication link 70 or for establishing and maintaining GPS information 71.

Still referring to FIG. 5, the camera system 10 further includes a plurality of sensors 90 operably connected to the housing 40 for conveniently providing real-time temperature and barometric pressure data for a predetermined area surrounding the housing 40. Such data can advantageously be used by the hunter to better predict when an animal is likely to be in the area surrounding the housing 40, allowing for more effective and successful planning of their hunting trips. The camera system ID further includes a sensor for checking battery status. Such a sensor notifies a user of the need for recharging or replacing part of the transmitted data.

Figure 6:
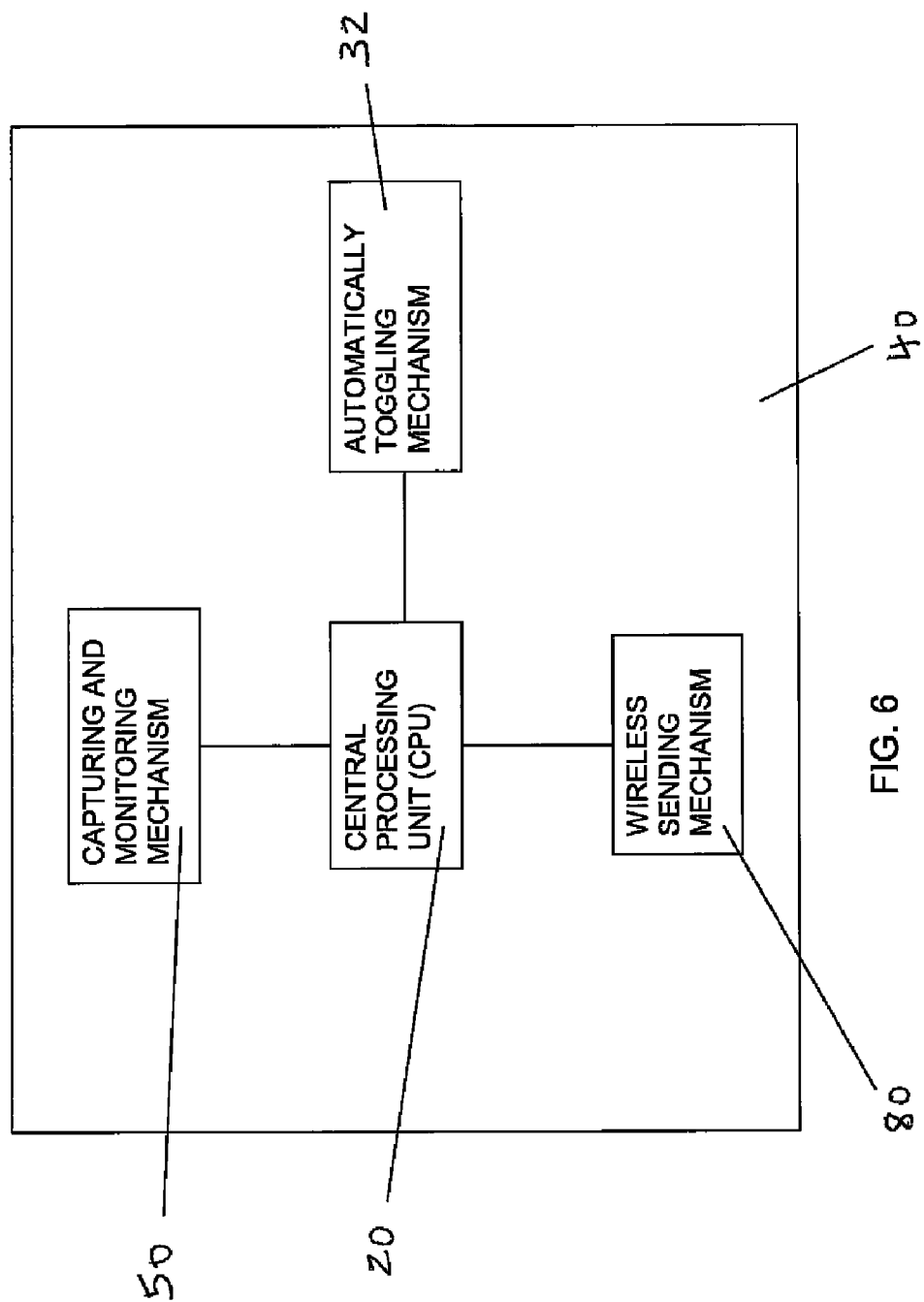
FIG. 6 is a high-level schematic block diagram of the camera system, in accordance with another embodiment of the present invention.
Figure 7:
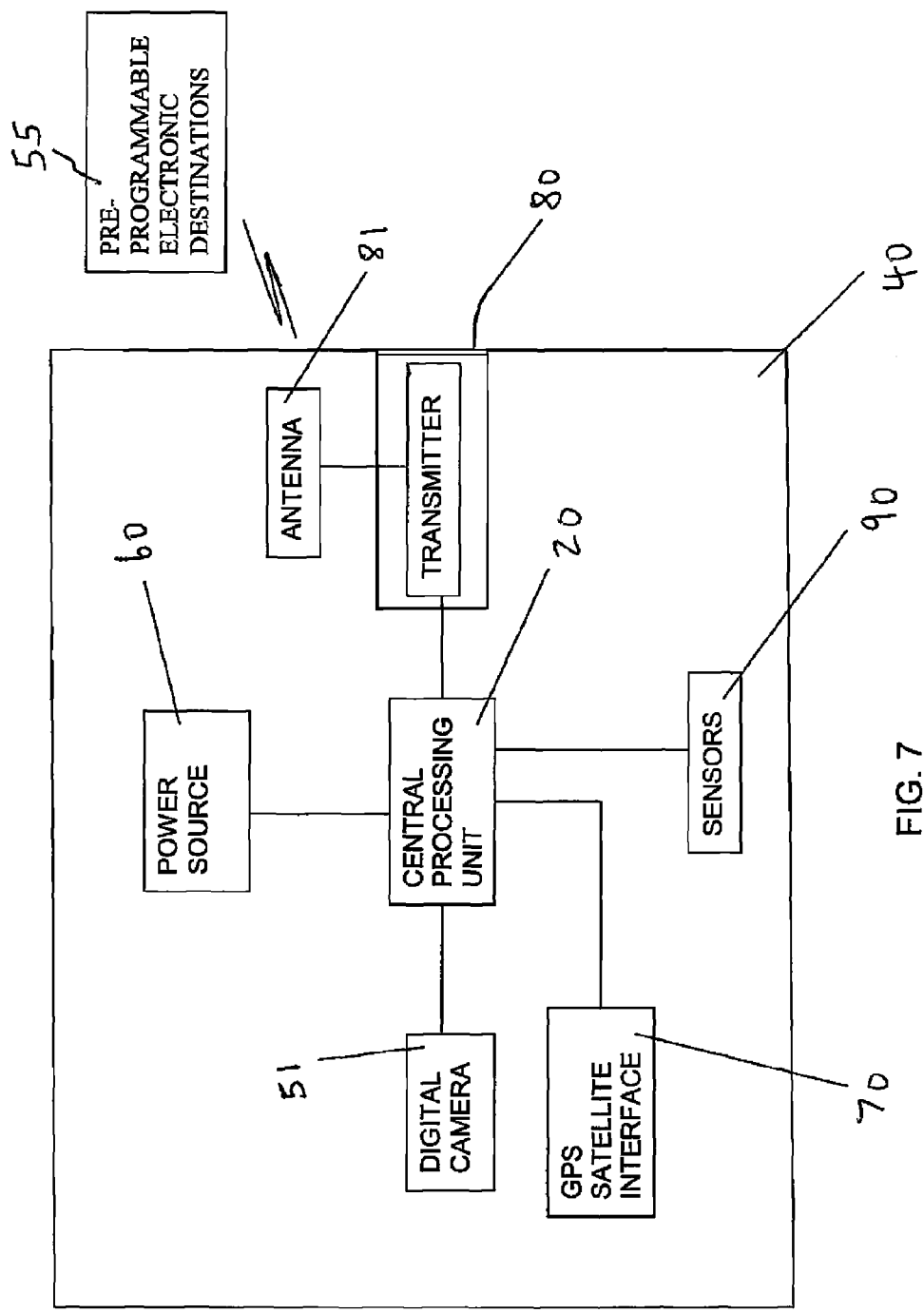
FIG. 7 is a schematic block diagram showing the interrelationship between the major electronic components of the embodiment shown in FIG. 6.

Now referring to FIGS. 6 and 7, another embodiment of the present invention is illustrated without the use of the hand-operable controller 30. Such an embodiment operates as a stand-alone camera system for capturing and transmitting real-time trail data over a wireless communication system to pre-programmable electronic destinations 55. The camera system further includes a housing 40 that is in wireless communication with the pre-programmable electronic destinations 55.

Exemplary pre-programmable electronic destinations 55 may include at least one of a phone number/account, e-mail address, web address/account, for example.

The housing 40 includes a central processing unit (CPU) 20 and a mechanism 50 for capturing and monitoring game trail images over an extended period of time. The capturing and monitoring mechanism 50 is disposed at the housing 40 and further is communicatively coupled to the CPU 20. The capturing and monitoring mechanism 50 may include a digital camera 51 or video recording device, for example.

Another mechanism 32 is provided for automatically toggling the capturing and monitoring mechanism 50 between operable and non-operable modes. The present invention further includes a mechanism 80 for wirelessly sending the trail images in real-time to the pre-programmable electronic destinations. Such a mechanism 80 may include a transmitter, for example.

In this manner, the CPU 20 receives triggering information and thereby sets the capturing mechanism 50 to a triggering mode. Such triggering information is set at a sensitivity level and a time frame. The automatic toggling mechanism 32 includes a plurality of infra-red sensors 90 that detect a plurality of operating parameters. The CPU 20 monitors the operating parameters in a sleep mode until at least one of the infra-red sensors 90 is tripped. If a triggered interruption does not last for the time frame, the CPU 20 returns to the sleep mode for conserving battery consumption. If the triggered interruption lasts for the time frame, the CPU 20 wakes up the capturing and monitoring mechanism 50 and thereby causes the capturing and monitoring mechanism 50 to automatically capture an image of a triggered interrupter associated with the triggered interruption.

As an example, the operating parameters may include at least one operating parameter including motion, temperature, light, barometric pressure, and internal power source fluctuations.

In operation, the system 10 is taken to the location to be set up. The system 10 is turned on at which point, the GPS of the system accesses the signals of the GPS system identifying the location of system 10. Once identified, that information (co-ordinates—latitude and longitude) is entered into system 10. Simultaneous to the GPS signal/location being identified, the system 10 is establishing the digital cellular link to the cellular system available at that location. The system 10 automatically establishes whether it is in home area or roam area (similar to conventional cellular phones currently employed in the industry. Once both are established, system 10 is ready for "Input Data" from the user. The user can enter special identification names/numbers/etc. for recognition upon receipt of information. The user can also correct/modify information remotely via readily available cellular/satellite electronic devices such as a cell phone, a personal digital assistant, a smart phone, or a personal computer, for example.

Once all input information is finalized unit is "set" for triggering. Triggering information is set for sensitivity, time frame, and other factors as needed. Once system 10 is "set", operation of unit works as follows: system 10 monitors through infra-red sensors any motion, temperature, light, barometric pressure, battery strength fluctuations. System 10 monitors this in basic "sleep" mode (Power Conserving) until movement/infra-red trigger unit is tripped. System 10 then turns on, "wakes up", to monitor if triggered interruption lasts for pre-programmed timeframe. If so, unit triggers camera to capture image of triggered interrupter. Once image is captured, system 10 transmits image (along with monitored information data, i.e., time/date, temperature, barometric pressure, location, battery status) to the pre-programmable electronic destinations. Once image and data are transmitted to the pre-programmable electronic destinations, the unit automatically resets to allow for the next trigger.

System 10 can also be remotely requested to "trigger" and transmit via the pre-programmable electronic destinations on demand. System 10 and housing 40 should be placed and programmed prior to remote electronic communication formats. System 10 through CPU 20 monitors battery life continuously through smart battery technology, as well known in the industry. When no triggers appear for "programmable" timeframe, system 10 goes into "sleep" mode for battery conservation. System 10 through CPU 20 notifies the user via satellite/cellular transmission that battery requires recharge or replacement. Advantageously, all transmitted images are "stamped" with programmed input information from user, i.e., location, time/date, battery status, temperature, pressure, etc.

In the AMPS (Advanced Mobile Phone System) cellular system, which is the analog cellular system used in the United States, each cellular base station has 832 channels. The 832 channels are divided among at least two competing cellular carriers. Each cellular carrier uses 21 of the 416 channels to carry control signals. Each control channel includes a Forward Control Channel (FOCC) and a Reverse Control Channel (RECC).

The cellular base station uses the FOCC to send information to cellular telephones, which send information back to the cellular base station via the RECC. The FOCC and RECC are used to establish a cellular telephone call through a local switch, once the cellular telephone call goes through a local switch. Once the cellular telephone call is established, the call is moved to one of the non-control channels and the released control channel is made available to establish other cellular telephone calls.

The cellular base station broadcasts a System Identification ("SID") signal, which identifies the cellular system to cellular telephones receiving it. When a cellular telephone is turned on, it compares the SID signal it receives against an SID stored within the telephone, which identifies the cellular telephone's home system. If the received SID is not the same as the stored SID, the cellular telephone is "roaming" and the "roam" indicator on the telephone is illuminated.

Subsequently, the cellular telephone transmits its identity to the cellular base station via the RECC. The RECC transmission includes the telephone's Mobile Identification Number ("MIN"), which is a unique 10-digit number (analogous to a telephone number including an area code) that is programmed into the cellular telephone. The first six digits of the MIN identify the cellular telephone's home system. The RECC also includes an Electronic Serial Number ("ESN"), a unique 32-bit serial number permanently stored in the cellular telephone which uniquely identifies the cellular telephone. The cellular base station will receive the MIN and ESN through the RECC and determine that the MIN does not correspond to a local number. Using the MIN, the cellular base station will determine the home system for the cellular telephone and send a validation signal to that system. The cellular local switches in the United States are interconnected through the Intersystem Signaling Network, which allows them to send and receive validation information.

The validation signal, known under IS-41 as a Registration/Notification Invoke (REGNOT) message, includes the cellular telephone's MIN and ESN. The REGNOT message also includes the identity of the cellular base station sending the message. The cellular telephone's home system will respond with a Registration/Notification Return Result (REGNOT) message. In the REGNOT message, the cellular telephone's home system will either indicate that it will take financial responsibility for calls made by the cellular telephone or it will refuse to validate the cellular telephone. If validation occurs, a subsequent exchange of messages establishes the features (such as call forwarding) available to the cellular telephone.

The validation process just described uses the cellular system's control channels. Again, once a cellular telephone call is initiated, the control channel that was used to set up the call is released for other purposes.

Upon receipt of the page from page satellite, the CPU 20 determines the location, temperature reading, pressure reading and captured images/videos of the trail site using the GPS signals from the GPS system. The apparatus then formats the real-time data into the payload portion of a cellular RECC signal and transmits it to a local cellular base station. The MIN portion of the RECC signal may contain a unique MIN or it may be a MIN that is common to all triggerable data-transmitting devices serviced by a common service provider. Alternatively, the MIN may be different for each of the devices.

The service provider can now communicate the real-time data of the trail site with the user located at a remote site.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A camera system for capturing and transmitting real-time trail data over a wireless communication system to pre-programmable electronic destinations, said camera comprising:
   a housing comprising
      a central processing unit (CPU),
      means for capturing and monitoring game trail images over an extended period of time,
      means for automatically toggling said capturing and monitoring means between operable and non-operable modes, and
      means for wirelessly sending the trail images in real-time to the pre-programmable electronic destinations,
   wherein said automatic toggling means comprises a plurality of infra-red sensors that detect a plurality of operating parameters;
   wherein said CPU monitors said operating parameters in a sleep mode until at least one of said infra-red sensors is tripped;
   if a triggered interruption does not last for a time frame, said CPU returns to said sleep mode for conserving battery consumption;
   if said triggered interruption lasts for said time frame, said CPU wakes up said capturing and monitoring means and thereby causes said capturing and monitoring means to automatically capture an image of a triggered interrupter associated with said triggered interruption.

2. The camera system of claim 1, wherein said operating parameters comprise: at least one operating parameter including motion, temperature, light, barometric pressure, and internal power source fluctuations.

3. The camera system of claim 1, wherein said housing comprises:
   a housing base and a housing cover pivotally coupled thereto, said housing base and said housing cover being provided with engageable outer edge portions, said housing further comprising a plurality of hasps extending outwardly from said outer edge portions, one pair of said hasps for receiving a fastening member therethrough and maintaining said housing at a closed position, said housing further comprising a plurality of flexible straps extending along a width of said housing cover and having opposed end portions secured to said housing and removably attachable to other ones of said hasps respectively, said straps for assisting to maintain said housing at an elevated position during operating conditions.

4. The camera system of claim 3, wherein said capturing and monitoring means comprises:
   a digital camera including a protective cover oppositely attached to said housing cover so that said camera cover can mate with said camera when said housing is adapted to a closed position.

5. A camera system for capturing and transmitting real-time trail data over a wireless communication system to pre-programmable electronic destinations, said camera comprising:
   a housing comprising
      a central processing unit (CPU),
      means for capturing and monitoring game trail images over an extended period of time,
      means for automatically toggling said capturing and monitoring means between operable and non-operable modes, and means for wirelessly sending the trail images in real-time to the pre-programmable electronic destinations;

wherein said CPU receives triggering information and thereby sets said capturing means to a triggering mode, said triggering information being set at a sensitivity level and a time frame;

wherein said automatic toggling means comprises a plurality of infra-red sensors that detect a plurality of operating parameters;

wherein said CPU monitors said operating parameters in a sleep mode until at least one of said infra-red sensors is tripped;

if a triggered interruption does not last for said time frame, said CPU returns to said sleep mode for conserving battery consumption;

if said triggered interruption lasts for said time frame, said CPU wakes up said capturing and monitoring means and thereby causes said capturing and monitoring means to automatically capture an image of a triggered interrupter associated with said triggered interruption.

6. The camera system of claim 5, wherein said operating parameters comprise: at least one operating parameter including motion, temperature, light, barometric pressure, and internal power source fluctuations.

7. The camera system of claim 5, wherein said housing comprises:
   a housing base and a housing cover pivotally coupled thereto, said housing base and said housing cover being provided with engageable outer edge portions, said housing further comprising a plurality of hasps extending outwardly from said outer edge portions, one pair of said hasps for receiving a fastening member therethrough and maintaining said housing at a closed position, said housing further comprising a plurality of flexible straps extending along a width of said housing cover and having opposed end portions secured to said housing and removably attachable to other ones of said hasps respectively, said straps for assisting to maintain said housing at an elevated position during operating conditions.

8. The camera system of claim 7, wherein said capturing and monitoring means comprises:
   a digital camera including a protective cover oppositely attached to said housing cover so that said camera cover can mate with said camera when said housing is adapted to a closed position.

9. A camera system for capturing and transmitting real-time trail data over a wireless communication system to pre-programmable electronic destinations, said camera comprising:
   a housing comprising
      a central processing unit (CPU),
      means for capturing and monitoring game trail images over an extended period of time, said capturing and monitoring means being disposed at said housing and further being communicatively coupled to said CPU,
      means for automatically toggling said capturing and monitoring means between operable and non-operable modes, and
      means for wirelessly sending the trail images in real-time to the pre-programmable electronic destinations;

wherein said CPU receives triggering information and thereby sets said capturing means to a triggering mode, said triggering information being set at a sensitivity level and a time frame;

wherein said automatic toggling means comprises a plurality of infra-red sensors that detect a plurality of operating parameters;

wherein said CPU monitors said operating parameters in a sleep mode until at least one of said infra-red sensors is tripped;

if a triggered interruption does not last for said time frame, said CPU returns to said sleep mode for conserving battery consumption;

if said triggered interruption lasts for said time frame, said CPU wakes up said capturing and monitoring means and thereby causes said capturing and monitoring means to automatically capture an image of a triggered interrupter associated with said triggered interruption.

10. The camera system of claim 9, wherein said operating parameters comprise: at least one operating parameter including motion, temperature, light, barometric pressure, and internal power source fluctuations.

11. The camera system of claim 9, wherein said housing comprises:
   a housing base and a housing cover pivotally coupled thereto, said housing base and said housing cover being provided with engageable outer edge portions, said housing further comprising a plurality of hasps extending outwardly from said outer edge portions, one pair of said hasps for receiving a fastening member therethrough and maintaining said housing at a closed position, said housing further comprising a plurality of flexible straps extending along a width of said housing cover and having opposed end portions secured to said housing and removably attachable to other ones of said hasps respectively, said straps for assisting to maintain said housing at an elevated position during operating conditions.

12. The camera system of claim 11, wherein said capturing and monitoring means comprises:
   a digital camera including a protective cover oppositely attached to said housing cover so that said camera cover can mate with said camera when said housing is adapted to a closed position.

* * * * *